United States Patent [19]
Phallen et al.

[11] Patent Number: 4,917,348
[45] Date of Patent: Apr. 17, 1990

[54] FILLING NOZZLE CUT-OFF VALVE

[75] Inventors: Iver J. Phallen, Youngstown; Richard J. Jezuit, Lancaster; Patrick J. Lynch, North Tonawanda, all of N.Y.

[73] Assignee: Oden Corporation, Buffalo, N.Y.

[21] Appl. No.: 270,644

[22] Filed: Nov. 14, 1988

[51] Int. Cl.$^4$ .......................................... F16K 31/365
[52] U.S. Cl. ................................ 251/61.1; 137/625.3; 141/285; 251/367
[58] Field of Search ............... 251/61.1, 367; 137/872, 137/885, 269, 625.3, 625.4; 141/285, 392

[56] References Cited

U.S. PATENT DOCUMENTS

| | | | |
|---|---|---|---|
| 3,693,611 | 9/1972 | Ploss | 251/61.1 |
| 3,727,623 | 4/1973 | Robbins | 251/331 |
| 3,792,720 | 2/1974 | Robbins | 251/61.1 |
| 3,936,029 | 2/1976 | Brandt | 251/61.1 |
| 3,937,440 | 2/1976 | MacGregor et al. | 251/61.1 |
| 4,037,622 | 7/1977 | Osheroff et al. | 251/61.1 |
| 4,168,724 | 9/1979 | Graffunder et al. | 251/61.1 |
| 4,274,452 | 6/1981 | Schmitt | 137/625.3 |
| 4,304,260 | 12/1981 | Turner et al. | 137/613 |
| 4,324,275 | 4/1982 | Ward | 251/148 |
| 4,606,382 | 8/1986 | Biller et al. | 141/1 |
| 4,703,913 | 11/1987 | Hunkapiller | 251/61.1 |

Primary Examiner—A. Michael Chambers
Attorney, Agent, or Firm—Edwin T. Bean, Jr.; Martin G. Linihan; John C. Thompson

[57] ABSTRACT

A diaphragm valve suitable for use as filling nozzle cut-off valve in the container filling industry. The valve includes a valve head (18) having a operational surface (62) provided with a centrally located shallow recessed portion (64) and an air hole (68) extending to the recessed portion. The valve further includes a valve body (16) having a smooth surface disposed in alignment with the operational surface of the valve head, inlet and outlet ports (24, 26, respectively), and spaced apart inlet and outlet passageways (36, 38, respectively) extending respectively from the inlet and outlet ports to inlet and outlet passageway openings (36a, 38a, respectively) in the area of the smooth surface opposite the recessed portion of the valve head, the inlet and outlet passageway openings being arranged in two columns symmetrical with the center of the smooth surface. The valve further includes a diaphragm (20) disposed between the valve head and the valve body, the diaphragm extending across both the recessed portion of the valve head and the passageway openings in the smooth surface. Screws 86 are provided to hold the part together with the diaphragm sandwiched between the operational surface of the valve head and the smooth surface of the valve body.

17 Claims, 2 Drawing Sheets

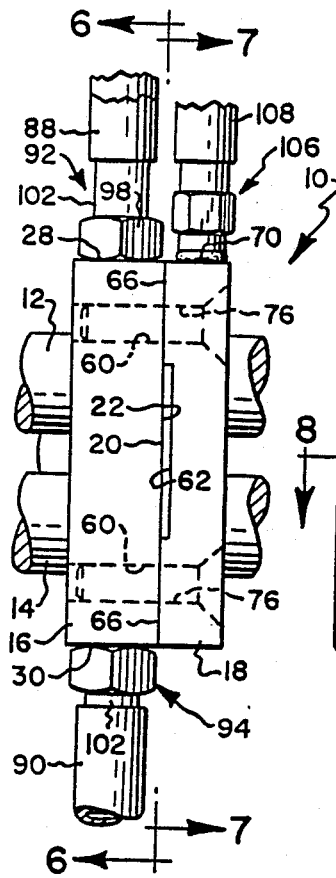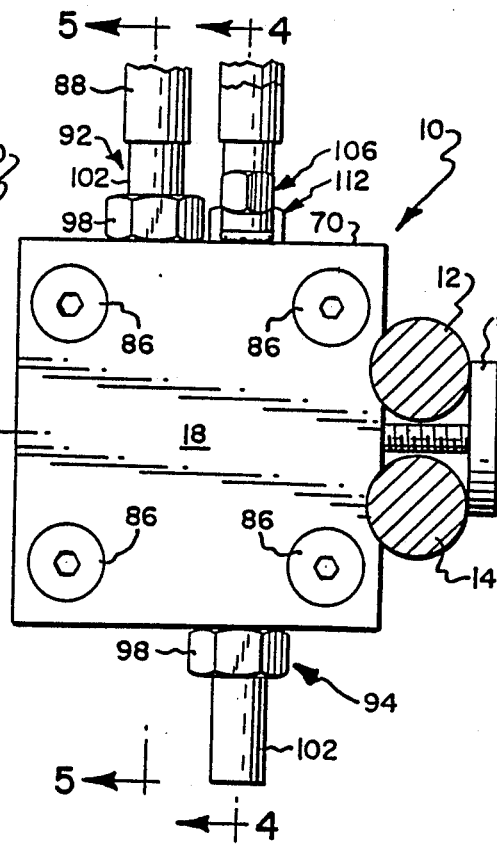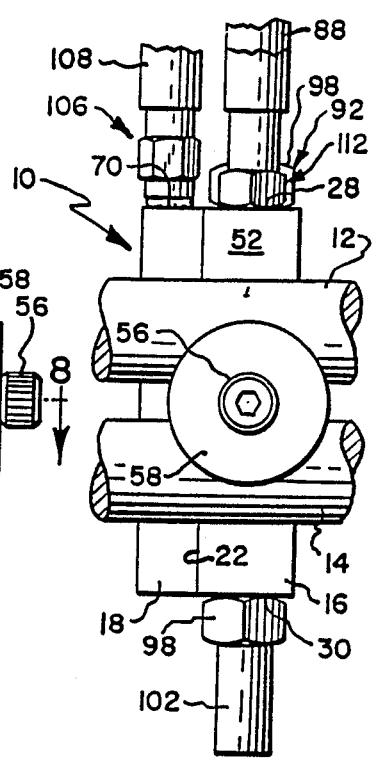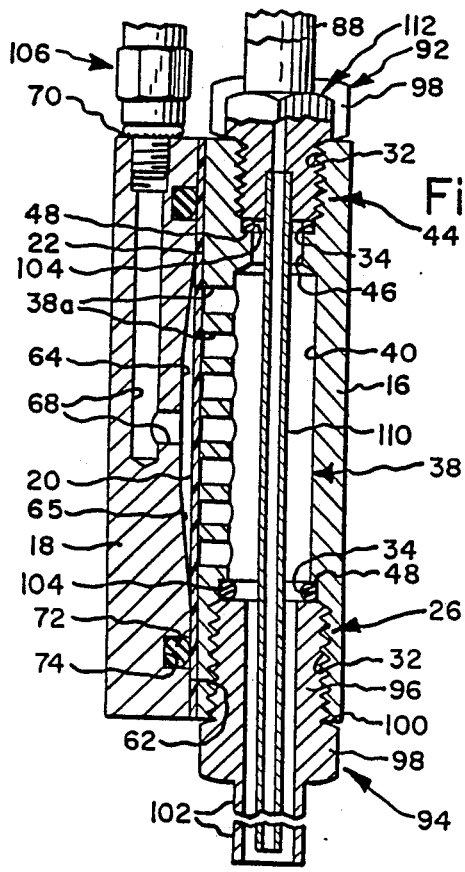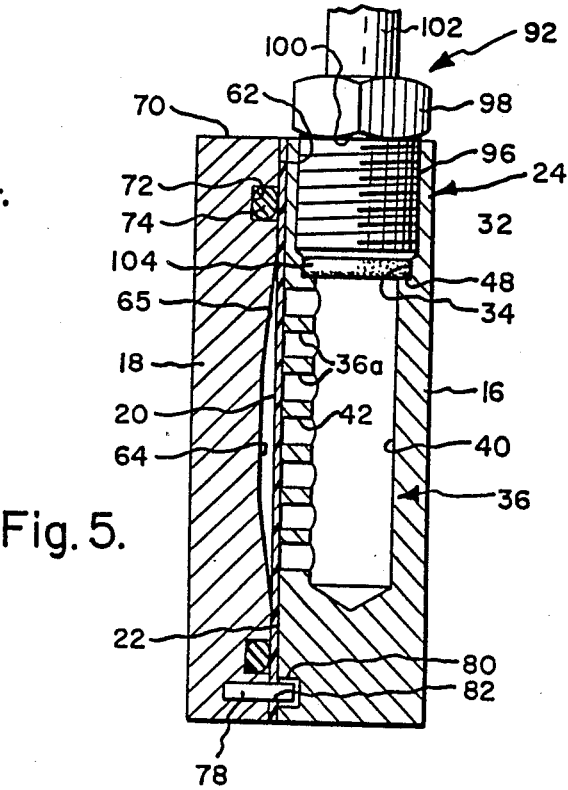

FILLING NOZZLE CUT-OFF VALVE

FIELD OF THE INVENTION

The present invention relates generally to liquid filling machinery and more particularly to a diaphragm valve suitable for use as a filling nozzle cut-off valve in the container filling industry.

BACKGROUND OF THE INVENTION

In the container filling industry, filling nozzle cut-off valves are utilized for quickly shutting off the flow of a fluid into a container after proper fill has been achieved. The fluids being dispensed may include pharmaceutical preparations dispensed in very low volumes, materials of very low viscosity such as alcohols, materials having a high viscosity such as heavy greases, foamy materials such as liquid detergents, abrasive materials such as toothpaste, string materials such as petrolatum, and fluent materials having particles entrained therein such as strawberry jam. While a large number of nozzle control valves have been developed for handling specific types of fluids, (one such example being shown in U.S. Pat. No. 4,606,382), a satisfactory general purpose filling nozzle cut-off valve has yet to be developed. A general purpose filling nozzle cut-off valve must not only be suitable for all types of fluids, but it must also be fast acting having a clean cut-off, have no perceptible leakage subsequent to cut-off, be capable of being operated over a large range of operational pressures, be durable having a relatively indefinite service life, be of relatively low cost, be of simple design, be sanitary, and be easy to take apart for cleaning purposes. Additionally there should be very little motion of the filling nozzle cut-off valve as it shifts between its open and closed positions to avoid spitting, and the discharge through the outlet should be laminar. The filling nozzle cut-off valves also should be of a compact design so that they may be disposed closely adjacent one another when filling multiple small diameter containers in an in-line filling machine. Because of the many differing criteria for such a valve typically a manufacturer of filling machines will of necessity offer a large number of filling valves to his customers to meet their varied product requirements.

OBJECTS AND SUMMARY OF THE INVENTION

It is an object of the present invention to provide a filling nozzle cut-off valve for use in a filling machine, which valve is suitable for use with virtually all fluids.

It is a further object of the present invention to provide a filling nozzle cut-off valve which is fast acting, has a clean cut-off, and has no perceptible leakage subsequent to cut-off.

It is a further object of the present invention to provide a filling nozzle cut-off valve which is durable having a relatively indefinite service life.

It is yet another object of the present invention to provide a filling nozzle cut-off valve of simple design, relatively low cost.

Another object of the present invention is to provide a nozzle filling cut-off valve which is sanitary and easy to take apart for cleaning purposes.

Additionally, it is another object of the present invention to provide a filling nozzle cut-off valve which has very little motion as it shifts between an open and closed or cut-off position to avoid spitting of the material when shifted to its closed position.

Another object of the present invention is to provide a nozzle filling cut-off valve which provides for a laminar flow through its discharge to insure proper filling of the containers.

It is a further object of the present invention to provide filling nozzle cut-off valves for use in an in-line filling machine, which valves may be stacked closely adjacent to one another.

The above objects and other objects and advantages of this invention are achieved by providing a diaphragm valve assembly, the valve assembly including a diaphragm, formed of a sheet of polytetrafluroethylene, which diaphragm is sandwiched between a smooth surface on a valve body and an operational surface on a valve head. The valve body is provided with inlet and outlet passageways, which passageways extend from ports to a plurality passageway openings in the smooth surface, the openings being disposed symmetrically about the center of the surface. The valve head is provided with an operational surface having a shallow recessed portion and an annular ramp opposite the passageway openings, corner stops, and a compressed air line interconnected with the shallow recessed area, which air line is adapted to receive air under pressure to normally hold the diaphragm against the smooth surface of the valve body. The corner stops insure that the sandwich will be compressed together to a known gap. When the fluid in the inlet passageway is subjected to a pressure greater than the air pressure, the diaphragm will be shifted away from the smooth surface permitting flow from the inlet passageway opening to the outlet passageway opening. By establishing a controlled sandwich gap, it is possible to achieve a virtually indefinite service life. In the preferred design there are two columns of inlet and outlet passageway openings, which columns are arranged to be concentric to the center of the smooth surface.

The foregoing will become more apparent after a consideration of the following detailed description taken in conjunction with the accompanying drawings in which a preferred form of this invention is illustrated.

BRIEF DESCRIPTION OF THE DRAWINGS

FIG. 1 is a side elevational view of the filling nozzle cut-off valve assembly of this invention, the valve being shown mounted on two parallel rods.

FIGS. 2 and 3 are front and rear views, respectively, of the valve shown in FIG. 1.

FIGS. 4 and 5 are sectional views of the valve assembly taken generally along the lines 4—4 and 5—5, respectively in FIG. 1 and showing a diaphragm sandwiched between a valve body and a valve head.

DETAILED DESCRIPTION

Figure 6:
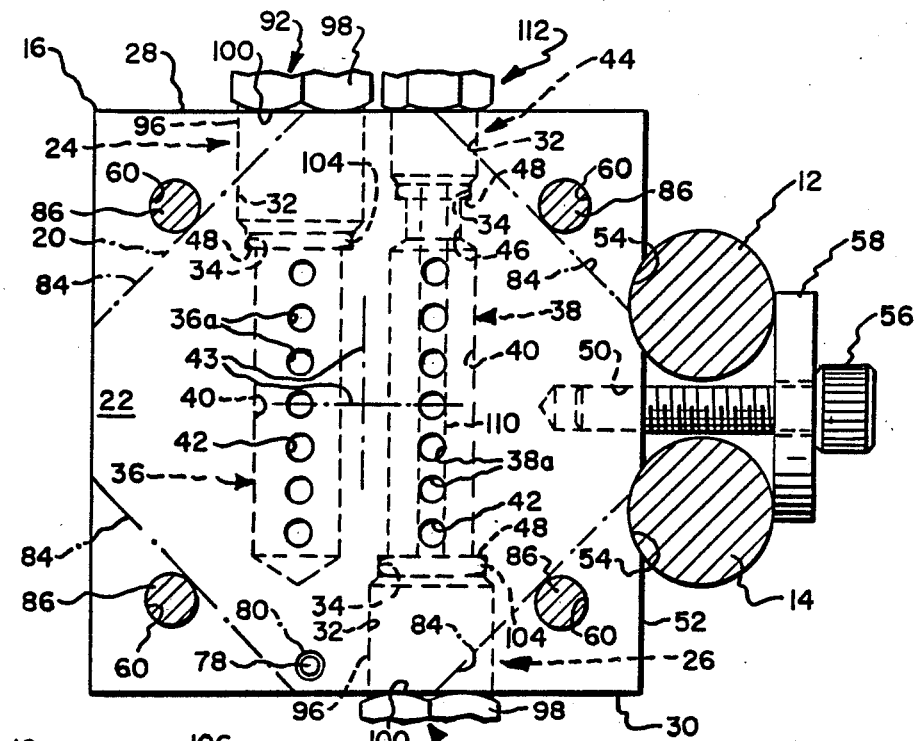
FIG. 6 is a side elevational view taken generally along the line 6—6 in FIG. 2, this view illustrating principally a smooth essentially flat surface of the valve body, the diaphargm being shown in phantom lines.

The filling nozzle cut-off valve of this invention is indicated generally at 10. In use it will customarily be adjustably mounted upon a support formed of upper and lower horizontal rods 12, 14, respectively. Each diaphragm valve is formed of three principal components, namely a valve body 16, a valve head 18, and a diaphragm 20, the diaphragm being sandwiched between the valve body and valve head. The diaphragm 20 is suitably cut from a sheet of polytetrafluroethylene, which sheet in the illustrated embodiment is 0.8 mm inches thick. Polytetrafluroethylene is the preferred material due to its chemical inactivity, its ability to be readily cleaned, and its ability to function from very low temperatures to temperatures up to 400° F. (205° C.). Test results to date show no wear upon the diaphragm when used with the preferred valve body and valve head and it is believed that the diaphragm will have a virtually indefinite service life when used in the illustrated environment. The actual configuration of the diaphragm and its operation will be described below. Test results to date indicate that diaphragms having a thickness of 0.5 mm will also perform in a satisfactory manner.

The valve body 16 in the illustrated embodiment is machined from a single piece of a suitable material, preferably 316 stainless steel. While machined stainless steel is shown in the preferred embodiment, in should be appreciated that other materials and methods of manufacture may be employed. While any material suitable for the end use can be utilized, in view of the wide variety of products which may be employed by the filling nozzle cut-off valve of this invention it is desirable that an essentially chemically inert material be selected for the valve body, which material may be easily cleaned and sterilized. Such a material is 316 stainless steel. However other materials may be utilized. While the valve body is made by machining, it can be appreciated that other methods of manufacture may be employed, as for example investment casting.

Figure 8:
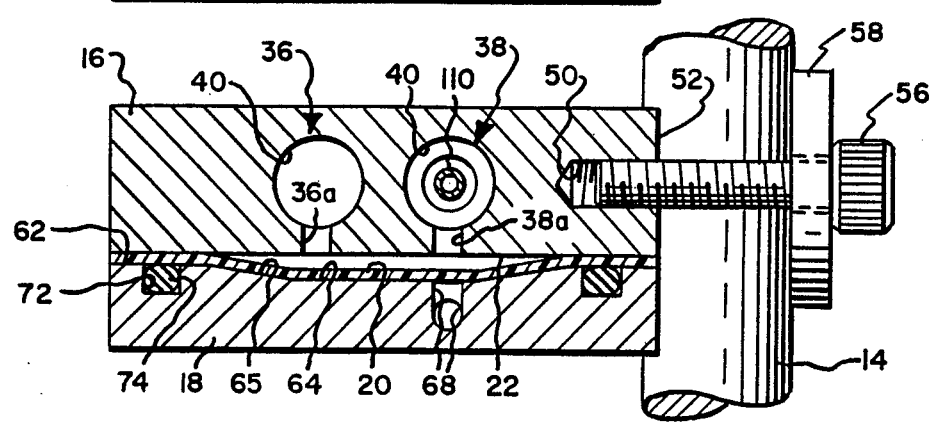
FIG. 8 is a sectional view taken generally along the line 8—8 in FIG. 1.

The valve body is initially in the shape of a rectangular solid having two opposed square sides. One of the square sides is machined to a smooth essentially flat surface 22 (FIGS. 6 and 8). Inlet and outlet ports, indicated generally by arrows 24, 26, respectively, (FIG. 6) are formed on two opposed surfaces 28, 30 adjacent the flat surface 22. Each of the inlet and outlet ports consists of an outer threaded portion 32 and an inner cylindrical portion 34. Inlet and outlet passageways, indicated generally by arrows 36, 38, respectively, (FIG. 6) extend from the inlet and outlet ports 24, 26, respectively, to passageway openings 36a, 38a, in the smooth surface 22. Each of the inlet and outlet passageways have a first portion 40 (FIG. 5) which is parallel to the smooth surface 22 and a plurality of second portions 42. In the illustrated embodiment each first portion 40 is cylindrical and the second portions 42, which are also cylindrical, extend at right angles to the center line of the first portion 40 and also at right angles to the surface 22. As can best be seen from FIG. 6 the first portion 40 of the inlet passageway 36 is parallel to the first portion 40 of the outlet passageway 38. As can also be seen from FIG. 6 the outlet portions 42 are also parallel with each other. Therefore, two parallel columns of passageway openings 36a, 38a are provided. By arranging the two columns of openings so that they are symmetrical with the center of the flat surface 22, the center being defined by the intersecting lines 43, laminar flow through the outlet port 26 will be insured provided that the flow into the inlet port 24 is laminar.

An auxiliary port indicated generally at 44 (FIG. 4) is disposed in coaxial alignment with the first portion 40 of the outlet passageway 38, the auxiliary portion also having an outer threaded portion 32 and an inner cylindrical portion 34, the auxiliary port being in communication with the first portion 40 of the outlet passageway 38 by means of a short cylindrical auxiliary passageway 46. The function of the auxiliary port will be described below.

The inner cylindrical portion 34 of each of the ports 24, 26, 44 is of greater diameter than the passageway to which it is connected. Thus, the inner cylindrical portions 34 of ports 24 and 26 are of larger diameter than the first portion 40 of the passageways 36, 38, and similarly the inner cylindrical portion 34 of the auxiliary port 44 is of larger diameter than the cylindrical auxiliary passageway 46. This will insure that a step 48 is formed between the inner cylindrical portion and the associated passageway for reasons which will become apparent.

A threaded aperture 50 is formed in that side 52 of the valve body which lies between the ports 24 and 26 to facilitate the mounting of the valve body upon the upper and lower support rods 12 and 14. The side 52 is additionally provided with upper and lower cut outs 54, each of the cut outs 54 being of such a size that it can snugly receive a surface portion of one of the spaced apart support rods 12, 14. A threaded fastener 56 is passed between the rods 12 and 14, and one end of the threaded fastener being received within the threaded aperture 50. A washer 58 is carried by the threaded fastener 56 and is adapted to bear against a side of each of the rods 12 and 14 opposite that side received within the cut outs 54 to secure the valve body to the rods 12 and 14 when the fastener is turned down into the aperture 50. By loosening the fastener 56 it is possible to quickly adjustably position the valve upon its support.

Finally, the valve body is also provided with threaded apertures 60 (FIG. 2) disposed at right angles to the surface 22, the apertures being disposed in each corner of the surface 22.

Figure 7:
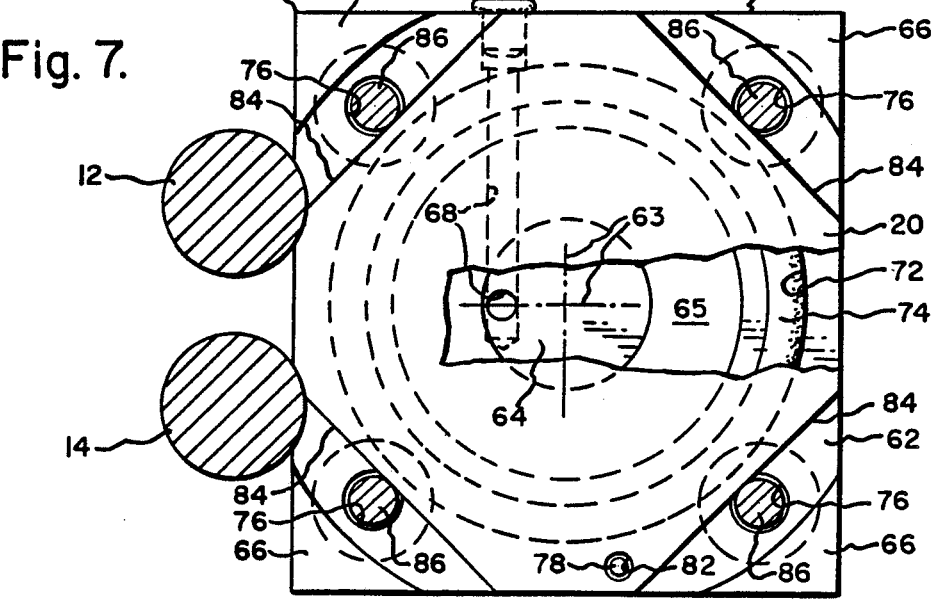
FIG. 7 is a side elevational view taken generally along the line 7—7 in FIG. 2 and showing the diaphragm overlying the operational surface of the valve head.

The valve head 18 in the illustrated may also be machined from a single piece of chemically inert material, such as 316 stainless steel, or alternatively it may be made from other materials such as aluminum. In this regard it should be observed that the head does not come into contact with the fluid being dispensed. The valve head is also a rectangular solid having two opposed square sides of substantially the same size as the valve body 16. As can be seen the valve head is thinner than the valve body. An operational surface 62 is ground in one side of the valve head, the operational surface being provided with a centrally located shallow recessed portion 64 and a peripheral annular ramp surface 65, the ramp surface being at a relatively small angle, for example 6 degrees. By using a small ramp angle the depth of the recessed portion is relatively shallow. Thus in the illustrated embodiment the depth is only 0.04 inches. The annular ramp is concentric about the center of the surface 62, the center being defined by intersecting lines 63. After surface 62 is ground, the remaining material 66 in each corner will function as stops, the height of all tops 66 being the same. An air hole or passageway 68 extends from an upper side 70 of the valve head 18 and terminates in the recessed area 64 as best shown in FIG. 7 the air hole being formed by drilling two intersecting holes. An annular groove 72 is formed in the operational surface 62 about the annular ramp surface 65, the annular groove being so dimensioned that it can snuggly receive an O-ring 74 with a portion of the O-ring projecting above the operational surface 62 when fully seated therein. The valve head is also provided with four countersunk apertures 76 between the stops 66 and the annular groove 72. Finally, the valve head is provided with an offset apertures into which is force fit a diaphragm alignment pin 78.

The valve body 16, valve head 18 and diaphragm 20 are assembled together by initially placing the diaphragm onto the operational surface 62 of the valve head with the alignment pin 78 passing through an offset alignment aperture 80 in the diaphragm. By having the alignment pin 78 and aperture 80 offset the diaphragm may be installed with only one face presented to the valve body. The valve head and valve body are then brought together with the diaphragm being sandwiched therebetween, the alignment pin 78 being received within an offset alignment aperture 82 in the valve body. At this point it should be noted that the corners of the diaphragm 20 are cut to form sides 84 which extend at 45° angles to the sides of the valve body or valve head, the sides being spaced inwardly of the stops 66 at such a distance that they just clear the threaded apertures 60. Flat head machine screws 86 are now passed through the countersunk apertures 76 and are threaded into the threaded apertures 50 to secure the parts together. The stops 66 limit the amount that the parts can be brought together, preventing the diaphragm 20 from being over compressed, the stops being of such a height that the O-ring 74 will bear against the diaphragm 20 about the shallow recessed area 64 to spring load the diaphragm and to form an effective air seal on one side of the diaphragm and fluid seal on the other side of the diaphragm. When the parts are assembled the center of surface 62 will coincide with the center of surface 22.

After the principal components have been assembled together it is now only necessary in most situations to attach to the valve an inlet line 88 and an outlet nozzle 90. To this end inlet and outlet fittings, indicated generally at 92, 94, respectively, are provided. Each of the fittings includes a threaded portion 96 which is adapted to be screwed into the outer threaded portion 32 of the associated port, a hexagonal portion 98, there being a shoulder 100 between the threaded portion 96 and the hex portion 98, and a tubular extension 102. The inlet line 88 is adapted to be disposed about the tubular extension 102 of the inlet fitting 92 and may, if necessary, be held in place by any suitable device, not shown. While an outlet nozzle 90 is shown in FIG. 2 separate from the tubular extension 102 of the outlet fitting 94, in many situations the tubular extension 102 will serve as the outlet nozzle. An annular seal 104 (which is preferably an O-ring coated with polytetrafluroethylene) is disposed between the inner end of the threaded portion 96 and the step 48, the seal isolating the threaded portions 32 and 96 from the fluid material which is introduced into the valve through the inlet fitting 92. The shoulder 100, which engages a side 28 or 30 of the valve body when the fitting is fully assembled to the valve body, will act as a stop surface preventing the annular seal 104 from becoming unduly compressed.

In operation after the parts have been assembled together in the manner shown in the drawings, air will be introduced into the air passageway 68 through an air fitting 106 and compressed air line 108. This will normally bias the diaphragm 20 against the surface 22 sealing the various passageway openings 36a, 38a. Each of the passageway openings 36a, 38a is of a relatively small diameter to prevent the diaphragm from deforming or distorting into the apertures so that the diaphragm will have an extended service life. The fluid to be discharged is introduced through the inlet line 88, inlet fitting 92, inlet port 28 and inlet passageway 36. When the diaphragm is biased across the smooth surface 22 flow will be prevented from the inlet side to the outlet side. However if the pressure in the inlet line should exceed that pressure exerted by the air line the diaphragm will be forced away from the smooth surface permitting flow of fluid from the second portions 42 of the inlet passageway 36 to the second portions of the outlet passageway 38 and then to the outlet nozzle. As soon as pressure in the inlet line is reduced to a level which does not exceed that of the air line the diaphragm will move back to its shut-off position, shown in FIGS. 4 and 5, effectively preventing further flow of the fluid. In a typical filling machine at the commencement of a filling cycle air in line 108 will be dumped to atmosphere and fluid flow to the valve will be initiated to place the fluid to be dispensed under pressure. At the end of the filling cycle fluid flow will be terminated and air line 108 will be connected to a source of air under pressure.

As there is very little movement of the diaphragm during the operation of the filling nozzle cut-off valve there should be no spitting of the product through the outlet nozzle. Also, by minimizing the movement of the diaphragm a very long service life is achieved. Additionally, as the fluid only comes into contact with the valve body (preferably made of 316 stainless steel), the diaphragm (preferably made of polytetrafluroethylene), the inlet and outlet fittings 92 and 94 (preferably made of 316 stainless steel), and the seals 104 (coated with polytetrafluroethylene) there is virtually no contamination to the fluid as these materials are all essentially inert. By utilizing this construction it is very easy to disassemble the parts for cleaning and/or sterilization.

With most products the operation as described above will be satisfactory and thus the auxiliary port will normally receive a plug (not shown). However, with certain materials due to their nature it is not possible to achieve satisfactory results without additional equipment. Thus, if the material has a very low surface tension, as for example lightweight silicon oils or alcohols, or if the product is stringy, as for example petrolatum, it is necessary to remove any material which may drip from the nozzle, or to eliminate the strings. To this end, an air pulse or vacuum aspiration tube 110 is mounted within the first portion 40 of the outlet passageway 38, the tube 110 extending into the nozzle as best shown in FIG. 4. The upper end of the air pulse or vacuum aspiration tube 110 is in turn connected to a fitting 112, the upper end of the fitting in turn being connected to a suitable line 114. As the operation of air pulse or vacuum aspiration tubes are well known in the art this portion of the valve by itself will not be described further.

By having the fluid fittings 92 and 94 carried by the sides of the valve body, and also by having the air fitting 106 and air pulse fitting 112 also carried by sides of the valve head and valve body, respectively, it is possible to position one valve very closely to another. Thus, a plurality of valves 10 may be mounted upon the support rods 12 and 14 with the valves in actual physical contact with each other. This permits the stacking of valves when a plurality of containers are to be filled at the same time. Thus, if the thickness of the valve body is ⅜ inch and the thickness of the valve head is ⅜ inch (including the stop) it is possible to stack valves together so there is no more than one inch between the center line of the outlet nozzles. Therefore, a plurality of relatively small diameter containers (down to 1 inch diameter) may be filled simultaneously with the diaphragm valve of this application.

While the surface 22 shown in the illustrated embodiment is a smooth essentially flat surface, in some situations it may be desirable to use a concave surface similar to that formed by surfaces 64 and 65, as when the fluid to be dispensed is subject to very low operational pressures.

Although the diaphragm valve of the present invention has been developed for use as a filling nozzle cut-off valve in the container filling industry, it may have use in other applications. Thus, while a preferred structure in which the principles of the present invention have been incorporated is shown and described above, it is to be understood that this invention is not to be limited to the particular details shown and described above, but that, in fact, widely differing means may be employed in the broader aspects of this invention.

What is claimed is:

1. A filling nozzle cut-off valve comprising:
   a valve head having an operational surface provided with a centrally located shallow recessed portion and an air hole extending to the recessed portion;
   a valve body having a smooth surface disposed in alignment with the operational surface of the valve head, inlet and outlet ports, spaced apart inlet and outlet passageways extending respectively from the inlet and outlet ports to inlet and outlet passageway openings in an area of the smooth surface opposite the recessed portion of the valve head, the inlet and outlet passageway openings being arranged in two columns symmetrical with the center of the smooth surface;
   a diaphragm disposed between the valve head and the valve body and extending across both the recessed portion of the valve head and the passageway openings in the smooth surface; and
   holding means which holds the parts together with the diaphragm sandwiched between the operational surface of the valve head and the smooth surface of the valve body.

2. The valve as set forth in claim 1 wherein each of the passageways includes a first portion parallel to the smooth surface and a plurality of secondary portions extending substantially at right angles to the first portion and the smooth surface.

3. The valve as set forth in claim 2 wherein the first portion is cylindrical and the plurality of secondary portions are in line with each other and with the center line of the cylindrical first portion.

4. The valve as set forth in claim 3 wherein the first portion of the inlet and outlet passageways are parallel to each other.

5. The valve as set forth in claim 1 further characterized by the provision of an O-ring adapted to bear upon the diaphragm about the shallow recessed area to spring load the diaphragm and to form an effective air and fluid seal.

6. The valve as set forth in claim 5 wherein the operational surface of the valve head is provided with an annular groove, the O-ring being disposed therein whereby the O-ring is isolated by the diaphragm from the material disposed within the inlet and outlet passageways.

7. The valve as set forth in claim 1 wherein stops are provided which extend between the valve head and the valve body in an area which does not receive the diaphragm, said stops preventing the diaphragm from being unduly compressed and distorted when properly sandwiched between the valve head and the valve body.

8. The valve as set forth in claim 7 wherein the valve head has a generally rectangular side, the stops being integral with the valve head on the corners of the rectangular side, the operational surface being located between the stops.

9. The valve as set forth in claim 8 wherein the holding means are threaded fasteners which pass an area between the stops and the diaphragm.

10. The valve as set forth in claim 9 wherein each of the inlet and outlet ports include an inner cylindrical portion and an outer threaded portion, the inner cylindrical portion being of a diameter greater than the diameter of the passageway to form a step therebetween, and further characterized by the provision of an annular seal received by the inner cylindrical portion and a fluid fitting received by the threaded portion, the seal isolating the outer threaded portion from contact with the fluid material received by the valve.

11. The valve as set forth in claim 10 further characterized by the fitting being provided with a stop surface, the stop surface when contacting an outer surface of the valve body preventing the annular seal from being unduly compressed.

12. The valve as set forth in claim 1 wherein the diaphragm is formed from a sheet of polytetrafluroethylene material.

13. The valve as set forth in claim 12 wherein the sheet of polytetrafluroethylene material is 0.8 mm thick plus or minus 40%.

14. The valve as set forth in claim 1 wherein the valve head is provided with an off center alignment pin, and wherein the valve body and diaphragm are provided with corresponding off center alignment apertures which receive the alignment pin when the parts are assembled together to insure when the diaphragm is installed that the same side will always face the fluid side of the valve.

15. The valve assembly as set forth in claim 1 wherein the smooth surface is essentially flat.

16. A filling nozzle cut-off valve comprising:
   a valve head having an operational surface provided with a centrally located shallow recessed portion and an air hole extending to the recessed portion;
   a valve body having a smooth surface disposed in alignment with the operational surface of the valve head, inlet and outlet ports, spaced apart inlet and outlet passageways extending respectively from the inlet and outlet ports to inlet and outlet passageway openings in an area of the smooth surface opposite the recessed portion of the valve head, the inlet and outlet passageways openings being arranged in two columns symmetrical with the center of the smooth surface each of the passageways including a first portion parallel to the smooth surface and a plurality of secondary portions extending substantially at right angles to the first portion and smooth surface, the valve body further including an auxiliary port in line with the first portion of the outlet passageway;

an outlet nozzle interconnected with the outlet port;

an air tube, one end of which tube is received by the auxiliary port, the tube extending from the auxiliary port through the first portion of the outlet passage and into the outlet nozzle;

a diaphragm disposed between the valve head and the valve body and extending across both the recessed portion of the valve head and the passageway openings in the smooth surface; and holding means which holds the parts together with the diaphragm sandwiched between the operational surface of the valve head and the smooth surface of the valve body.

17. A filling nozzle cut-off valve comprising:

a valve head having an operational surface provided with a centrally located shallow recessed portion and an air hole extending to the recessed portion;

a valve body having a smooth surface disposed in alignment with the operational surface of the valve head, inlet and outlet ports, spaced apart inlet and outlet passageways extending respectively from the inlet and outlet ports to inlet and outlet passageway openings in an area of the smooth surface opposite the recessed portion of the valve head, the inlet and outlet passageways openings being arranged in two columns symmetrical with the center of the smooth surface;

a diaphragm disposed between the valve head and the valve body and extending across both the recessed portion of the valve head and the passageway openings in the smooth surface;

an air fitting extending to one side of the valve head, the air fitting being in fluid communication with the air hole; and inlet and outlet fittings carried by sides of the valve body, the inlet and outlet fittings being in communication with the inlet and outlet ports, respectively, said fittings extending to the side of the valve body, the parts being so arranged and constructed so that a plurality of diaphragm valves may be stacked relatively close to one another.

* * * * *